United States Patent Office 2,911,372
Patented Nov. 3, 1959

2,911,372
LANOLIN-AMMONIA COMPOSITION

Floyd M. Mizell, Pittsburgh, and
Harry G. Austin, Sr., Mars, Pa.

No Drawing. Application May 22, 1956
Serial No. 586,362

1 Claim. (Cl. 252—153)

This invention relates to a new household cleaning composition which includes household aqua ammonia and lanolin. This composition has the superior cleaning characteristics of the well known household ammonia product and coupled therewith the well known and highly desirable skin-treating and protective characteristics of lanolin.

This application is a continuation-in-part of our previously filed application Serial No. 519,238 of June 30, 1955, entitled Lanolin-Ammonia Composition, now abandoned.

Household ammonia has been used by the housewife as a cleaning agent for many years. It has long been appreciated that household ammonia deleteriously affects the skin of the user by a drying action which produces irritation to a degree which becomes very serious in many cases. Attempts have been made to uncover an equally satisfactory cleaning agent to replace ammonia; the attempts have met with little success. Recent efforts, therefore, have been directed primarily toward counteracting the skin-drying and irritating effects of ammonia by the addition of various substances to the ammonia product. Because of the many problems involved, no satisfactory and salable item appears to have been developed.

It is the purpose, therefore, of this invention to provide a household ammonia type product which includes an agent capable of preventing the skin-drying and irritating effect of ammonia. This is accomplished by the addition of lanolin to the household ammonia, the lanolin being prepared in a manner such that it can be satisfactorily dispersed in the household ammonia and provide a suspension of desired qualities having stability, long shelf life, an attractive white or milky white color if desired, chemical stability to reaction by ammonia, and stability to the action of hard water salt which might otherwise cause separation of the lanolin from the household ammonia.

It is believed well established that lanolin is far superior to other oils, such as petroleum oils, in the field of skin treatment and protection. Petroleum oils cannot be absorbed by the skin to effect the needed and desired skin lubrication; lanolin is absorbed by the skin and therefore functions in a highly satisfactory manner.

Through extensive research, the combination of this invention of lanolin with ammonia has been accomplished. This combination involved extremely difficult problems completely foreign to the combination of petroleum oils and the like with ammonia. Certain types of oil having certain constituents may be dispersed in household ammonia by allowing the oil to react with the household ammonia for a period of approximately 24 hours. No such reaction is encountered by dispersing lanolin in household ammonia.

Lanolin, due to its specific gravity, chemical content and solubility characteristics, presents an extremely difficult problem of dispersion in ammonia.

This invention, therefore, provides a lanolin concentrate wherein the lanolin is dispersed with a specific surface active agent and is solubilized in a suitable oil base of specific characteristics; the lanolin concentrate may then be added to the well known household ammonia and by slight agitation by spontaneously and uniformly dispersed in the ammonia.

The preferred surfactant employed to disperse the lanolin in the ammonia was discovered through extensive research. It was found that alkyl polyoxyethylene amine was capable of producing the proper emulsification and solubilization of lanolin in the concentrate for dilution in the ammonia water. Also it was found that this surfactant provided a uniform suspension of the concentrate in the ammonia which is extremely stable and has a very long shelf life. Further, it was found that this surfactant provided chemical stability to the mix against reaction with ammonia as well as stability of the concentrate against separation due to the action of hard water salt. Through research, the preferred alkyl polyoxyethylene amine has been discovered to be nonyl polyoxyethylene amine containing 44 mols of ethylene oxide.

To dilute and fluidize the lanolin, a petroleum type base oil was selected which is colorless, odorless, non-residual and having a specific gravity of 0.773 to 0.778 at 60° F.; an A.P.I. gravity of 49.5/51.5; a flash point of 170/180° F.; I.B.P. of 385/400° F.; end point of disc. 465/480° F.; and unsulfonatable residue of 98%. This oil provides a highly satisfactory oil carrier base which will completely evaporate so that no residue remains.

If it is desired to give the suspension additional dispersion qualities so that the mix appears white or milky white in color, a small amount of another emulsifier is incorporated in the concentrate, this material being an alkyl phenyl polyethylene glycol ether, such as nonyl phenyl polyethylene glycol ether with 7 mols of ethylene oxide.

In some cases, a small amount of isopropyl palmitate may be incorporated in the concentrate to facilitate the solubilizing of the lanolin.

The following formulation is representative of the preferred lanolin concentrate highly suitable for suspension in household ammonia:

25% by weight of lanolin
10% by weight of nonyl polyoxyethylene amine containing 44 mols of ethylene oxide
8% by weight of nonyl phenyl polyethylene glycol ether with 7 mols of ethylene oxide
57% by weight of a petroleum base oil which is colorless, odorless and non-residual as described and identified hereinabove Other formulations found to be satisfactory are as follows:

Example 1

25% by weight of lanolin
15% by weight of nonyl polyoxyethylene amine containing 44 mols of ethylene oxide
60% by weight of a petroleum base oil which is colorless, odorless and non-residual as described and identified hereinabove

Example 2

25% by weight of lanolin
5% by weight of nonyl polyoxyethylene amine containing 44 mols of ethylene oxide
20% by weight of nonyl phenyl polyethylene glycol ether with 7 mols of ethylene oxide
50% by weight of a petroleum base oil which is colorless, odorless and non-residual as described and identified hereinabove

Example 3

25% by weight of lanolin
10% by weight of nonyl polyoxyethylene amine containing 44 mols of ethylene oxide
8% by weight of nonyl phenyl polyethylene glycol ether with 7 mols of ethylene oxide
4% by weight of isopropyl palmitate solvent
53% by weight of a petroleum base oil which is colorless, odorless and non-residual as described and identified hereinabove

Example 4

25% by weight of lanolin
15% by weight of nonyl polyoxyethylene amine containing 44 mols of ethylene oxide
4% by weight of isopropyl palmitate solvent
56% by weight of a petroleum base oil which is colorless, odorless and non-residual as described and identified hereinabove

Example 5

25% by weight of lanolin
5% by weight of nonyl polyoxyethylene amine containing 44 mols of ethylene oxide
20% by weight of nonyl phenyl polyethylene glycol ether with 7 mols of ethylene oxide
4% by weight of isopropyl palmitate solvent
46% by weight of a petroleum base oil which is colorless, odorless and non-residual as described and identified hereinabove The concentrate is prepared by melting the lanolin, introducing the surfactants and solvent into the fluid lanolin, and diluting the resultant mixture with the desired amount of base oil which maintains the fluid condition. The lanolin concentrate may then be poured directly into the household ammonia in the desired amount. A small amount of agitation will disperse the concentrate very readily and easily. A highly satisfactory lanolin-ammonia composition is formulated by diluting one gallon of the above lanolin concentrate in approximately 145 gallons of household aqua ammonia, this being by volume an amount of one part lanolin concentrate to 145 parts household aqua ammonia.

While the above preferred formulation for the lanolin concentrate recites specific weight percentages for each ingredient, it will be understood that these may be varied as desired to change the formulation's performance and also to change the appearance of the final ammonia product. For example, a higher amount of lanolin requires a higher amount of emulsifier; similarly, a lower amount of lanolin requires a lower amount of emulsifier.

The dilution ratio of the lanolin concentrate in the ammonia must be controlled. A dilution of 1 part concentrate to 200 parts ammonia approaches the limit of stability. A dilution of 1 part concentrate to 100 parts ammonia results in a solution exceedingly milky and too high in oil and lanolin content.

The surfactant used is, of course, very important to the qualities and performance of the product. The preferred surfactant of this invention, as previously stated, is an alkyl polyoxyethylene amine, namely, nonyl polyoxyethylene amine containing 44 mols of ethylene oxide; the product produced therewith has exceptionally high performance characteristics including, as tests have proved, long shelf life with no separation. The preferred commercially available surfactant from this group is sold under the name Agent 442K by General Aniline & Film Corp. In one test no separation occurred during a test period of more than six months' storage in de-ionized ammonia water.

The resultant product will have the advantageous qualities discussed above, and it will be readily appreciated that in use the product will provide the required lubrication for the skin. Also the product on test has shown that no problem of streaks on glassware and the like is encountered. The use of surfactants in the emulsification of the lanolin brings about an increased cleaning activity of the ammonia water through lowering of surface tension and increased detergent action. It will be noticed that the product contains a relatively small amount of lanolin as compared to the base oil; therefore, the possibility of lanolin streaks is not of any consequence as tests have shown. Further, the emulsified and solubilized state of the lanolin contributes to its non-streaking qualities. The microscopic particles of lanolin are not tenacious in nature.

It will be understood that changes may be made in the details of the instant invention without departing from the spirit of the invention.

From the group of the surfactants nonyl phenyl polyethylene glycol ether with 7 mols of ethylene oxide, the preferred surfactant is known by the name Tergitol NP-27, a Carbide and Carbon Chemical Company product.

It is intended to cover all changes and modifications of the example of the invention which do not constitute departures from the spirit and scope of the invention.

We claim:

A household ammonia composition comprising essentially household ammonia within the range of substantially 100 to 200 parts by volume and a dispersed lanolin concentrate substantially 1 part by volume, said concentrate comprising lanolin in an amount of substantially 25% by weight, non-ionic nonyl polyoxyethylene amine containing 44 mols of ethylene oxide in an amount of substantially 10% by weight, a non-ionic nonyl phenyl polyethylene glycol ether with 7 mols of ethylene oxide in an amount of substantially 8% by weight, and the remainder being composed of a petroleum oil that is colorless, odorless and leaves no residue on evaporation.

References Cited in the file of this patent

UNITED STATES PATENTS

| | | |
|---|---|---|
| 1,970,578 | Schoeller et al. | Aug. 21, 1934 |
| 2,213,477 | Steindorff et al. | Sept. 3, 1940 |
| 2,554,913 | Kimball | May 29, 1951 |

FOREIGN PATENTS

| | | |
|---|---|---|
| 618,075 | Great Britain | Feb. 16, 1949 |

OTHER REFERENCES

Washing, Cleaning and Polishing Materials, Bur. of Standards Circular C424 (1939), pp. 22 and 23.

Chemical Formulary, Bennett, Chem. Pub. Co., N.Y., vol. 9 (1951), pp. 52, 53, 54 and 64.